US012630195B2

(12) United States Patent (10) Patent No.: US 12,630,195 B2
Kim (45) Date of Patent: May 19, 2026

(54) DEVICE AND METHOD FOR CONTROLLING AUTONOMOUS DRIVING

(71) Applicants: Hyundai Motor Company, Seoul (KR); Kia Corporation, Seoul (KR)

(72) Inventor: Dong Hyuk Kim, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 183 days.

(21) Appl. No.: 18/353,415

(22) Filed: Jul. 17, 2023

(65) Prior Publication Data

US 2024/0199089 A1 Jun. 20, 2024

(30) Foreign Application Priority Data

Dec. 14, 2022 (KR) ........................ 10-2022-0175189

(51) Int. Cl.
*B60W 60/00* (2020.01)
*B60W 50/14* (2020.01)

(52) U.S. Cl.
CPC ........ *B60W 60/0053* (2020.02); *B60W 50/14* (2013.01); *B60W 2050/146* (2013.01); *B60W 2540/229* (2020.02)

(58) Field of Classification Search
CPC ............. B60W 60/0053; B60W 50/14; B60W 2050/146; B60W 2540/229; B60W 40/08;
B60W 60/001; B60W 2040/0827; B60W 2050/0002; B60W 2556/45; B60K 35/00; B60K 35/10; B60K 35/22; B60K 35/28
See application file for complete search history.

(56) References Cited

U.S. PATENT DOCUMENTS

| | | | |
|---|---|---|---|
| 2018/0141570 A1* | 5/2018 | Kimura | ................. B60W 50/14 |
| 2020/0130577 A1* | 4/2020 | Mitra | ........................ B60Q 9/00 |
| 2021/0094583 A1* | 4/2021 | Choi | ...................... B60W 40/09 |
| 2021/0188289 A1* | 6/2021 | Oba | ......................... G08G 1/16 |
| 2022/0301323 A1* | 9/2022 | Matsumura | ............ G06V 40/18 |

* cited by examiner

*Primary Examiner* — Imran K Mustafa
*Assistant Examiner* — Andrew Sang Kim
(74) *Attorney, Agent, or Firm* — Slater Matsil, LLP

(57) ABSTRACT

An embodiment autonomous driving control device for controlling autonomous driving includes a display device, a sensor device including a sensor, a memory having instructions stored thereon, and a controller operatively connected to the sensor device and the memory, wherein the instructions, when executed by the controller, are configured to cause the autonomous driving control device to obtain state information of a user using the sensor device while controlling a host vehicle based on a specified autonomous driving mode, to determine whether the state information satisfies a specified condition, and to provide a user interface about transfer of a control right of the host vehicle to the user using the display device in response to a determination that the state information satisfies the specified condition.

20 Claims, 6 Drawing Sheets

DEVICE AND METHOD FOR CONTROLLING AUTONOMOUS DRIVING

CROSS-REFERENCE TO RELATED APPLICATIONS

This application claims the benefit of Korean Patent Application No. 10-2022-0175189, filed on Dec. 14, 2022, which application is hereby incorporated herein by reference.

TECHNICAL FIELD

The present disclosure relates to a device and a method for controlling autonomous driving.

BACKGROUND

As autonomous vehicles gradually spread, various technologies related to autonomous driving are being developed. The autonomous driving may be classified into partial autonomous driving, conditional autonomous driving, highly autonomous driving, and/or fully autonomous driving based on a control level thereof.

In a specific travel situation of a host vehicle, it may be necessary to transfer a control right of the host vehicle to a user under control of the autonomous driving of the host vehicle. For example, in a specific situation, there may be a need to switch a driving mode from an autonomous driving mode to a manual driving mode. Accordingly, an autonomous driving control device may display a notification about the transfer of the control right of the host vehicle to the user.

For example, the autonomous driving control device may recognize the need to transfer the control right to the user based on calculation results of various systems (e.g., at least one of a collision determination system, a vehicle location recognition system, a driving control system, or any combination thereof) for controlling the autonomous driving. Accordingly, the autonomous driving control device may provide the notification (or a user interface) about the transfer of the control right to the user in various ways.

For example, a state of the user may be used for the transfer of the control right of the host vehicle. For example, when it is identified that the user is in a drowsy state, the autonomous driving control device may inform the user of the necessity of transferring the control right by displaying the various user interfaces for the user to get out of the drowsy state.

The autonomous driving control device according to the prior art may use various components to inform the user of the necessity of switching the driving mode of the host vehicle (or transferring the control right of the host vehicle). For example, the autonomous driving control device may visually and/or audibly convey the user interface about the transfer of the control right using a multimedia device (e.g., a display) disposed in at least one area inside the host vehicle. Accordingly, the user (or a driver) of the host vehicle may recognize that the control right of the host vehicle should be transferred as the user interface is output. For another example, the autonomous driving control device may transmit the user interface to an external device (e.g., a user terminal) electrically connected to the autonomous driving control device and corresponding to the user. Therefore, the autonomous driving control device may convey an intention of the autonomous driving control device to transfer the control right of the host vehicle to the user.

However, the method according to the prior art has a problem in that the user is identified to be in the drowsy state even though the user is not in the drowsy state and the unnecessary control right transfer notification is provided. For example, when the user is using the multimedia device and/or the user terminal inside the host vehicle while the host vehicle is traveling based on a specified autonomous driving mode (e.g., the conditional autonomous driving mode), the autonomous driving control device may erroneously determine that the user is in the drowsy state based on identifying a posture of the user, such as with a head thereof down. Accordingly, the unnecessary user interface provision may be caused, power consumption may increase, and usability of an autonomous driving function may deteriorate.

SUMMARY

The present disclosure relates to a device and a method for controlling autonomous driving. Particular embodiments relate to a technology of providing a user interface for transfer of a control right of a host vehicle to a user based on various methods in an autonomous driving control situation of the host vehicle.

Embodiments of the present disclosure can solve problems occurring in the prior art while advantages achieved by the prior art are maintained intact.

An embodiment of the present disclosure provides a device and a method for controlling autonomous driving that provide a user interface via at least a portion of a display device and/or an external device based on state information of a user when the autonomous driving control device recognizes a need to transfer a control right.

Another embodiment of the present disclosure provides a device and a method for controlling autonomous driving that determine a method for displaying a user interface about transfer of a control right based on whether there is at least one external device connected to the autonomous driving control device.

Another embodiment of the present disclosure provides a device and a method for controlling autonomous driving that determine a method for displaying a user interface about transfer of a control right based on whether the user input to at least one external device and/or an external device corresponding to a user is received within a specified period of time.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a device for controlling autonomous driving includes a display device, a sensor device including at least one sensor, a memory for storing one or more instructions, and a controller operatively connected to the sensor device and the memory. The instructions, when executed by the controller, cause the autonomous driving control device to obtain state information of a user using the sensor device while controlling a host vehicle based on a specified autonomous driving mode, determine whether the state information satisfies a specified condition, and provide a user interface about transfer of a control right of the host vehicle to the user using the display device when the state information satisfies the specified condition.

In one implementation, the instructions, when executed by the controller, may cause the autonomous driving control device to determine that the state information satisfies the specified condition and to provide the user interface about the transfer of the control right to the user using the display device when it is identified based on the state information that the user is in a drowsy state.

In one implementation, the device may further include a communication device. For example, the instructions, when executed by the controller, may cause the autonomous driving control device to determine whether the user is using at least one external device by utilizing the sensor device when the state information does not satisfy the specified condition, to determine whether the at least one external device is connected to the autonomous driving control device via the communication device when the user is using the at least one external device, to receive information about whether a user input for the at least one external device is received within a specified period of time from the at least one external device when the at least one external device is connected to the autonomous driving control device, and to continuously control the host vehicle based on the specified autonomous driving mode when it is determined based on the information that the user input for the at least one external device is received within the specified period of time.

In one implementation, the device may further include a communication device. For example, the instructions, when executed by the controller, may cause the autonomous driving control device to determine whether the user is using at least one external device by utilizing the sensor device when the state information does not satisfy the specified condition, to determine whether the at least one external device is connected to the autonomous driving control device via the communication device when the user is using the at least one external device, to receive information about whether a user input for the at least one external device is received within a specified period of time from the at least one external device when the at least one external device is connected to the autonomous driving control device, and to transmit the user interface about the transfer of the control right to the at least one external device when it is determined based on the information that the user input for the at least one external device is not received within the specified period of time.

In one implementation, the instructions, when executed by the controller, may cause the autonomous driving control device to continuously control the host vehicle based on the specified autonomous driving mode when it is determined that the user input for the at least one external device is received after transmitting the user interface about the transfer of the control right to the at least one external device.

In one implementation, the instructions, when executed by the controller, may cause the autonomous driving control device to provide the user interface about the transfer of the control right to the user using the display device when it is determined that the user input for the at least one external device is not received after transmitting the user interface about the transfer of the control right to the at least one external device.

In one implementation, the at least one external device may include a user terminal corresponding to the user.

In one implementation, the device may further include a communication device. For example, the instructions, when executed by the controller, may cause the autonomous driving control device to determine whether at least one multimedia device included in the display device is in operation by the user when the state information does not satisfy the specified condition and to provide the user interface about the transfer of the control right to the user via the at least one multimedia device when the at least one multimedia device is in operation.

In one implementation, the instructions, when executed by the controller, may cause the autonomous driving control device to provide the user interface about the transfer of the control right to the user using at least one external device other than the at least one multimedia device included in the display device when it is determined that a user input for the at least one multimedia device is not received after transmitting the user interface about the transfer of the control right to the at least one multimedia device.

In one implementation, the device may further include a communication device. For example, the instructions, when executed by the controller, may cause the autonomous driving control device to transmit the user interface about the transfer of the control right to at least one external device corresponding to the user.

According to another embodiment of the present disclosure, a method for controlling autonomous driving includes obtaining, by a controller, state information of a user using a sensor device while controlling a host vehicle based on a specified autonomous driving mode, determining, by the controller, whether the state information satisfies a specified condition, and providing, by the controller, a user interface about transfer of a control right of the host vehicle to the user using a display device when the state information satisfies the specified condition.

In one implementation, the providing, by the controller, of the user interface to the user may include determining, by the controller, that the state information satisfies the specified condition and providing the user interface about the transfer of the control right to the user using the display device when it is identified based on the state information that the user is in a drowsy state.

In one implementation, the method may further include determining, by the controller, whether the user is using at least one external device by utilizing the sensor device when the state information does not satisfy the specified condition, determining, by the controller, whether the at least one external device is connected to an autonomous driving control device via a communication device when the user is using the at least one external device, receiving, by the controller, information about whether a user input for the at least one external device is received within a specified period of time from the at least one external device when the at least one external device is connected to the autonomous driving control device, and continuously controlling, by the controller, the host vehicle based on the specified autonomous driving mode when it is determined based on the information that the user input for the at least one external device is received within the specified period of time.

In one implementation, the method may further include determining, by the controller, whether the user is using at least one external device by utilizing the sensor device when the state information does not satisfy the specified condition, determining, by the controller, whether the at least one external device is connected to an autonomous driving control device via a communication device when the user is using the at least one external device, receiving, by the controller, information about whether a user input for the at least one external device is received within a specified period of time from the at least one external device when the at least one external device is connected to the autonomous driving control device, and transmitting, by the controller, the user interface about the transfer of the control right to the at least one external device when it is determined based on the information that the user input for the at least one external device is not received within the specified period of time.

In one implementation, the method may further include continuously controlling, by the controller, the host vehicle based on the specified autonomous driving mode when it is determined that the user input for the at least one external device is received after transmitting the user interface about the transfer of the control right to the at least one external device.

In one implementation, the method may further include providing, by the controller, the user interface about the transfer of the control right to the user using the display device when it is determined that the user input for the at least one external device is not received after transmitting the user interface about the transfer of the control right to the at least one external device.

In one implementation, the at least one external device may include a user terminal corresponding to the user.

In one implementation, the method may further include determining, by the controller, whether at least one multimedia device included in the display device is in operation by the user when the state information does not satisfy the specified condition, and providing, by the controller, the user interface about the transfer of the control right to the user via the at least one multimedia device when the at least one multimedia device is in operation.

In one implementation, the providing, by the controller, of the user interface about the transfer of the control right to the user via the at least one multimedia device may include providing, by the controller, the user interface about the transfer of the control right to the user using at least one external device other than the at least one multimedia device included in the display device when it is determined that a user input for the at least one multimedia device is not received after transmitting the user interface about the transfer of the control right to the at least one multimedia device.

In one implementation, the providing, by the controller, of the user interface about the transfer of the control right to the user using the display device may include transmitting, by the controller, the user interface about the transfer of the control right to at least one external device corresponding to the user.

BRIEF DESCRIPTION OF THE DRAWINGS

The above and other objects, features, and advantages of embodiments of the present disclosure will be more apparent from the following detailed description taken in conjunction with the accompanying drawings, in which.

With regard to illustration of the drawings, the same or similar reference numerals may be used for the same or similar components.

DETAILED DESCRIPTION OF ILLUSTRATIVE EMBODIMENTS

Figure 1:
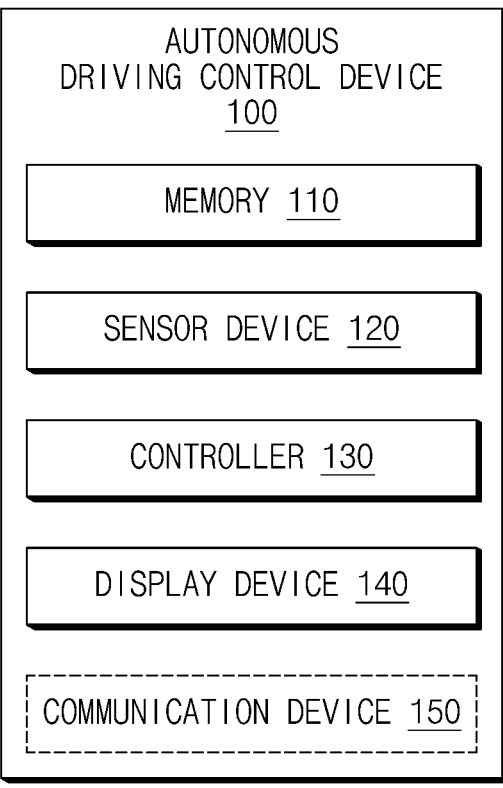
FIG. 1 is a block diagram illustrating components of an autonomous driving control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 6.

FIG. 1 is a block diagram illustrating components of an autonomous driving control device according to an embodiment of the present disclosure.

According to one embodiment, an autonomous driving control device 100 may include at least one of a memory 110, a sensor device 120, a controller 130, a display device 140, a communication device 150, or any combination thereof. The configuration of the autonomous driving control device 100 shown in FIG. 1 is exemplary, and embodiments of the present disclosure are not limited thereto. For example, the autonomous driving control device 100 may further include components (e.g., an interface) not shown in FIG. 1.

According to one embodiment, the memory 110 may store instructions or data. For example, the memory 110 may store one or more instructions that allow the autonomous driving control device 100 to perform various operations when executed by the controller 130.

For example, the memory 110 and the controller 130 may be implemented as a single chipset. The controller 130 may include at least one of a communication processor or a modem.

For example, the memory 110 may store various information associated with the autonomous driving control device 100. For example, the memory 110 may store information about an operation history of the controller 130. As an example, the memory 110 may store information associated with a state and/or operation of components (e.g., at least one of an electronic control unit (ECU), the sensor device 120, the controller 130, the display device 140, the communication device 150, or any combination thereof) of a host vehicle.

According to one embodiment, the sensor device 120 may include at least one sensor, and may acquire information about inside and outside of the vehicle and/or a state of the host vehicle in real time.

For example, the sensor device 120 may include at least one camera, at least one radar, and/or a LiDAR.

For example, the sensor device 120 may obtain state information of at least one user (e.g., a driver) inside the host vehicle. For example, the sensor device 120 may obtain the state information of the at least one user inside the host vehicle using the camera. For example, the state information of the user may include at least one of a posture, a motion, a direction of glance, biometric information, or any combination thereof of the user.

For example, the state information of the user obtained by the sensor device 120 may be processed via the controller 130. For example, the controller 130 may determine at least one of whether the user is in a drowsy state, whether the user is using a multimedia device, whether the user is using a user terminal, or any combination thereof based on processing of the state information of the user obtained by the sensor device 120.

According to one embodiment, the controller 130 may be operatively connected to at least one of the memory 110, the sensor device 120, the display device 140, the communication device 150, or any combination thereof. For example, the controller 130 may control an operation of at least one of the memory 110, the sensor device 120, the display device 140, the communication device 150, or any combination thereof.

For example, the controller 130 may control the host vehicle in an autonomous driving mode based on one of a plurality of autonomous driving steps. For example, the controller 130 may control the host vehicle in the autonomous driving mode based on a specified autonomous driving step (e.g., a level 3 and/or a conditional autonomous driving mode).

For example, the controller 130 may obtain the state information of the user using the sensor device 120 while controlling the host vehicle based on the specified autonomous driving mode. For example, the state information of the user may include at least one of the posture, the motion, the direction of glance, the biometric information, or any combination thereof of the user.

For example, the controller 130 may determine whether to transfer a control right of the host vehicle to the user based on the state information of the user and/or a travel situation of the host vehicle.

For example, the controller 130 may determine to transfer the control right of the host vehicle to the user based on occurrence of an event related to transfer of the control right of the host vehicle.

For example, the event related to the transfer of the control right of the host vehicle may include information about the travel situation of the host vehicle. For example, the event may include at least one of a traffic volume of a road on which the host vehicle is traveling, a travel state (e.g., at least one of a travel speed, a travel acceleration, a travel direction, or any combination thereof) of the host vehicle, a travel state of a vehicle in front of the host vehicle, or any combination thereof.

For example, the controller 130 may determine whether the state information satisfies a specified condition. The controller 130 may visually and/or audibly convey a user interface about the transfer of the control right of the host vehicle to the user based on whether the state information satisfies the specified condition. In other words, the controller 130 may provide information about the transfer of the control right of the host vehicle to the user based on the state information of the user.

For example, the specified condition may include whether the user is in a state in which a response to the transfer of the control right is not able to be immediately performed, such as whether the user is in the drowsy state. For example, the specified condition may include whether the state of the user identified based on at least one of the posture, the motion, the direction of glance, the biometric information, or any combination thereof of the user corresponds to the state in which the response to the transfer of the control right is not able to be immediately performed, such as the drowsy state.

For example, when the state information satisfies the specified condition, the controller 130 may use the display device 140 to provide the user interface about the transfer of the control right of the host vehicle to the user.

For example, the controller 130 may provide the user interface about the transfer of the control right via at least one multimedia device included in the display device 140.

For example, the controller 130 may provide the user interface via the display device 140 only under a specified condition.

For example, when it is identified based on the state information that the user is in the drowsy state, the controller 130 may determine that the state information satisfies the specified condition and provide the user interface about the transfer of the control right to the user using the display device 140.

For example, when the state information does not satisfy the specified condition, the controller 130 may use the sensor device 120 to determine whether the user is using at least one external device.

For example, when the user is using the at least one external device, the controller 130 may determine whether the at least one external device is connected to the autonomous driving control device 100 via the communication device 150. The at least one external device may include, for example, an external device (e.g., a smartphone of the user) corresponding to the user.

For example, when the at least one external device is connected to the autonomous driving control device 100, the controller 130 may receive information about whether a user input for the at least one external device is received within a specified period of time from the at least one external device via the communication device 150.

For example, when it is determined based on the received information that a user input for the at least one external device is received within the specified time, the controller 130 may continue to control the host vehicle based on the specified autonomous driving mode. In other words, when it is determined that the user input for the at least one external device is received within the specified period of time, the controller 130 may identify the user as not being in the drowsy state and continue to control the host vehicle based on the specified autonomous driving mode without providing the user interface.

For example, when it is determined based on the received information that the user input for the at least one external device is not received within the specified period of time, the controller 130 may transmit the user interface about the transfer of the control right to the at least one external device. In other words, when it is determined that the user input for the at least one external device is not received within the specified period of time, the controller 130 may identify the user as being in the drowsy state and provide the user interface, thereby visually and/or audibly providing a notification about the transfer of the control right to the user.

For example, when it is determined that the user input for the at least one external device is received after transmitting the user interface about the transfer of the control right to the at least one external device, the controller 130 may continue to control the host vehicle based on the specified autonomous driving mode. In other words, when it is determined that the user input for the at least one external device is received within the specified period of time, the controller 130 may identify the user as not being in the drowsy state and continue to control the host vehicle based on the specified autonomous driving mode.

For example, when it is determined that the user input for the at least one external device is not received after transmitting the user interface about the transfer of the control right to the at least one external device, the controller 130 may provide the user interface about the transfer of the control right to the user using the display device 140. In other words, when the at least one external device does not operate even after providing the user interface for the at least one external device, the controller 130 may use the display device 140 included in the autonomous driving control device 100 to provide the user interface about the transfer of the control right to the user.

For example, when the state information of the user does not satisfy the specified condition and there is no external device connected to the autonomous driving control device wo via the communication device 150, the controller 130 may determine whether to provide the user interface about the transfer of the control right based on whether the at least one multimedia device included in the display device 140 is operating.

For example, when the state information does not satisfy the specified condition, the controller 130 may determine whether the at least one multimedia device included in the display device 140 is operating by the user.

For example, when it is determined that the at least one multimedia device is operating, the controller 130 may provide the user interface about the transfer of the control right to the user via the at least one multimedia device.

For example, when it is determined that the user input for the at least one multimedia device is not received after transmitting the user interface about the transfer of the control right to the at least one multimedia device, the controller 130 may use the at least one external device other than the at least one multimedia device included in the display device 140 to provide the user interface about the transfer of the control right to the user. In other words, even when the state information does not satisfy the specified condition, when the user input for the multimedia device is not received within the specified period of time while the multimedia device is operating, the controller 130 may determine that the user is in a state in which an action corresponding to the transfer of the control right is not able to be immediately performed. Accordingly, the user interface for the transfer of the control right may be additionally provided to the user using the at least one external device other than the multimedia device.

For example, the controller 130 may transmit the user interface about the transfer of the control right to the at least one external device corresponding to the user. The at least one external device corresponding to the user may include the user terminal including the smartphone.

According to one embodiment, the display device 140 may include at least one output device. For example, the display device 140 may include the output device (e.g., a display and/or a speaker) included in at least a portion of the inside of the host vehicle.

For example, the display device 140 may provide the various information about the travel situation of the host vehicle to the user via visual and/or auditory content.

For example, the display device 140 may provide information about at least one of various user interfaces about the transfer of the control right of the host vehicle, the travel state of the host vehicle, the user state, or any combination thereof to the user in real time.

According to one embodiment, the communication device 150 may establish a communication channel (e.g., a wireless communication channel) between the autonomous driving control device 100 and the external device (e.g., the user terminal) and support communication via the established communication channel. For example, the communication device 150 may include one or more communication processors that operate independently of the controller 130 (e.g., an application processor) and support direct (e.g., wired) communication or wireless communication.

For example, the communication device 150 may include a wireless communication module (e.g., a cellular communication module, a short-distance wireless communication module, or a global navigation satellite system (GNSS) communication module) or a wired communication module (e.g., a local area network (LAN) communication module or a power line communication module). Among such communication modules, a corresponding communication module may communicate with the external device via a first network (e.g., a short-distance communication network such as Bluetooth, wireless fidelity (WiFi) direct, or infrared data association (IrDA)) or via a second network (e.g., a long-distance communication network such as a legacy cellular network, a 5G network, a next-generation communication network, Internet, or a computer network (e.g., LAN or WAN)) included in a network. Such various types of communication modules may be integrated as one component (e.g., a single chip) or implemented as a plurality of separate components (e.g., a plurality of chips). In addition, the communication device 150 and the controller 130 may be implemented as a single chip.

For example, the communication device 150 may transmit and receive various data based on the communication with the external device (e.g., the user terminal).

For example, the communication device 150 may transmit the user interface about the transfer of the control right to the external device.

Figure 2:
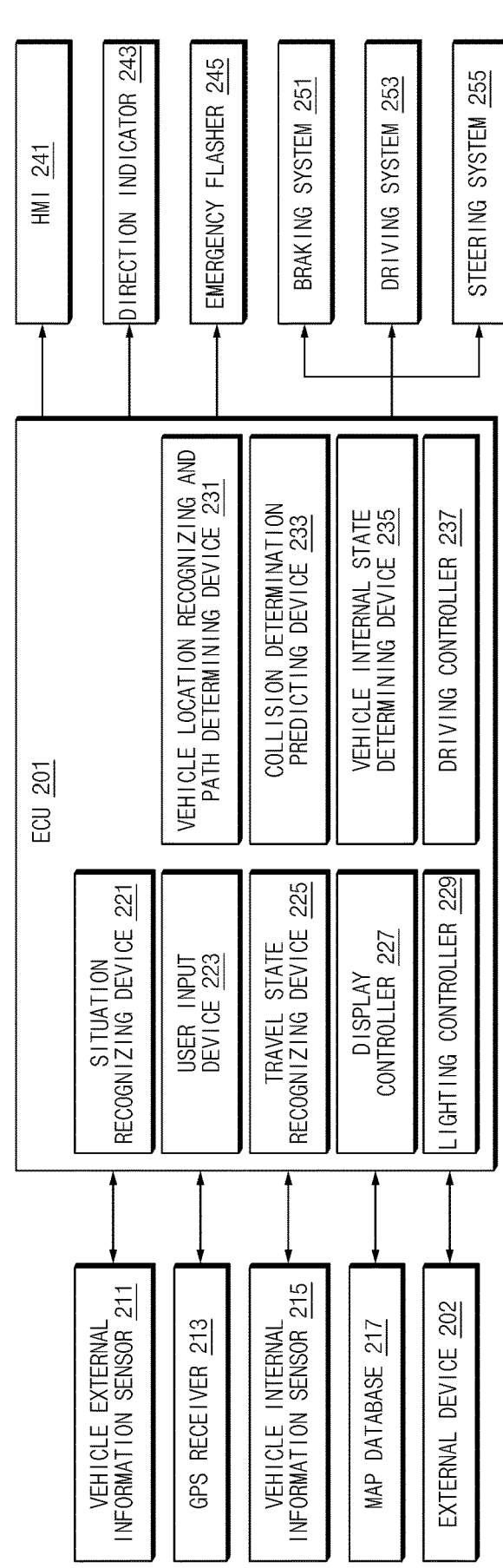
FIG. 2 is a block diagram illustrating components including an autonomous driving control device according to an embodiment of the present disclosure.

FIG. 2 is a block diagram illustrating components including an autonomous driving control device according to an embodiment of the present disclosure.

According to one embodiment, an autonomous driving control device (e.g., the autonomous driving control device 100 in FIG. 1) may include at least some of the components illustrated in FIG. 2. For example, the autonomous driving control device may control the various components under control of an electronic control unit (ECU) 201.

For example, a vehicle external information sensor 211 may obtain external information (e.g., at least one of weather information, other vehicle information, road information, or any combination thereof) of the host vehicle using at least one sensor.

For example, a GPS receiver 213 may obtain information about a current location of the host vehicle using at least one sensor.

For example, a vehicle internal information sensor 215 may obtain internal information (e.g., at least one of the user state information, the travel state, a component operation state, or any combination thereof) of the host vehicle using at least one sensor.

For example, a map database 217 may include map information for identifying the current location of the host vehicle. The map database 217 may include information of a place including a travel location of the host vehicle.

For example, an external device 202 may include the user terminal (e.g., the smartphone). For example, the ECU 201 may transmit the user interface about the transfer of the control right of the host vehicle to the external device 202.

According to one embodiment, the ECU 201 may include a situation recognizing device 221, a user input device 223, a travel state recognizing device 225, a display controller 227, a lighting controller 229, a vehicle location recognizing and path determining device 231, a collision determination predicting device 233, a vehicle internal state determining device 235, and/or a driving controller 237.

For example, the situation recognizing device 221 may recognize an external situation of the host vehicle based on at least a portion of the information obtained via the vehicle external information sensor 211. For example, the situation recognizing device 221 may recognize an overall situation of the place where the host vehicle is traveling.

For example, the user input device 223 may include at least one interface. For example, the user input device 223 may obtain a signal for controlling the host vehicle based on at least one of a touch input, a voice input, a motion input, or any combination thereof received from the user.

For example, the travel state recognizing device 225 may recognize the travel state of the host vehicle based on at least a portion of the information obtained via the vehicle internal information sensor 215. For example, the travel state recognizing device 225 may recognize a situation related to at least one of the travel speed, the travel direction, the travel acceleration, or any combination thereof of the host vehicle.

For example, the display controller 227 may control display information of a display device (e.g., the display device 140 in FIG. 1) included in the host vehicle. For example, the display controller 227 may control the display device to display the user interface about the transfer of the control right of the host vehicle via at least a portion of the display device based on a specified situation condition being satisfied.

For example, the lighting controller 229 may control at least one lighting device disposed in the host vehicle. For example, the lighting controller 229 may control the lighting device to display a lighting state corresponding to at least one of travel direction conversion of the host vehicle, a stop state of the host vehicle, an emergency situation of the host vehicle, or any combination thereof.

For example, the vehicle location recognizing and path determining device 231 may recognize the current location of the host vehicle and/or determine a travel path of the host vehicle. For example, the vehicle location recognizing and path determining device 231 may identify a destination of the host vehicle, determine the travel path from the current location to the destination, and perform driving control of the host vehicle.

For example, the collision determination predicting device 233 may calculate a possibility of the host vehicle colliding with an external object (e.g., at least one of another vehicle, a building, a guardrail, a person, or any combination thereof). For example, the collision determination predicting device 233 may calculate a possibility of a collision occurring during control of autonomous driving of the host vehicle and/or in an area surrounding the host vehicle.

For example, the vehicle internal state determining device 235 may determine an internal state of the host vehicle. For example, the vehicle internal state determining device 235 may identify a state of an object (e.g., at least one of a person, an item, or any combination thereof) existing inside the host vehicle. For example, the vehicle internal state determining device 235 may obtain the state information of the at least one user inside the host vehicle based on information obtained via the vehicle internal information sensor 215 and/or the external device 202.

For example, the driving controller 237 may control a driving device (e.g., a braking system 251, a driving system 253, and/or a steering system 255) based on the current location, a predicted location, and/or the travel path of the host vehicle calculated by the vehicle location recognizing and path determining device 231, thereby controlling the autonomous driving of the host vehicle.

For example, a human machine interface (HMI) 241 may include the at least one multimedia device (e.g., the display). The at least one multimedia device may include a device included in at least one of a center fascia, a windshield, a side glass, a cluster, or any combination thereof. The HMI 241 may visually and/or aurally provide at least one of the travel state of the host vehicle, an autonomous driving state, the external situation, or any combination thereof to the user.

For example, a direction indicator 243 may display information about the travel direction based on the travel state of the host vehicle. For example, the direction indicator 243 may visually display the information about the travel direction based on the control of the travel state recognizing device 225 and/or the display controller 227.

For example, an emergency flasher 245 may provide a flash indication about an emergency state of the host vehicle. For example, the emergency flasher 245 may provide the flash indication including information indicating that the host vehicle is in the emergency state under the control of the lighting controller 229.

For example, the braking system 251 may perform braking control of the host vehicle. For example, the braking system 251 may perform the braking control in an autonomous driving situation of the host vehicle under the control of the driving controller 237. For example, the braking system 251 may include at least one braking device (e.g., a brake).

For example, the driving system 253 may perform the driving control of the host vehicle. For example, the driving system 253 may perform the driving control in the autonomous driving situation of the host vehicle under the control of the driving controller 237. For example, the driving system 253 may include at least one driving device (e.g., a tire and/or a motor).

For example, the steering system 255 may perform steering control of the host vehicle. For example, the steering system 255 may perform the steering control in the autonomous driving situation of the host vehicle under the control of the driving controller 237. For example, the steering system 255 may include at least one steering device (e.g., a steering wheel).

Figure 3:
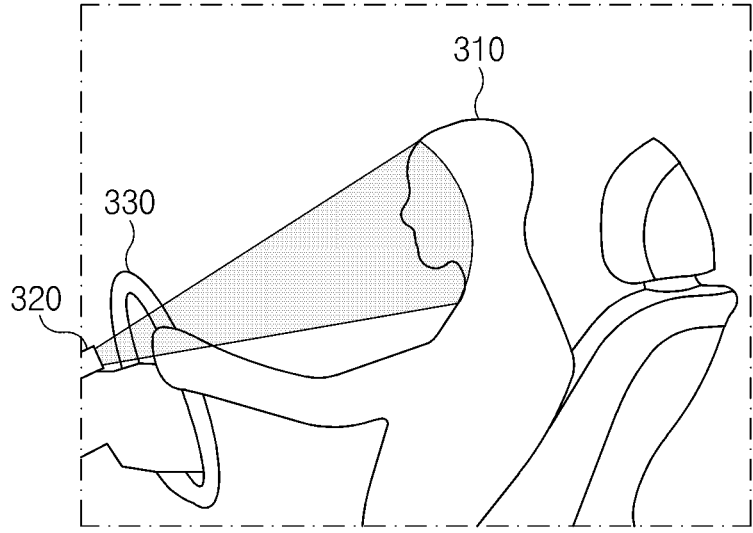
FIG. 3 is a conceptual diagram illustrating an operation of an autonomous driving control device according to an embodiment of the present disclosure.

FIG. 3 is a conceptual diagram illustrating an operation of an autonomous driving control device according to an embodiment of the present disclosure.

According to one embodiment, an autonomous driving control device (e.g., the autonomous driving control device 100 in FIG. 1) may obtain state information of a user 310 using at least one sensor 320 included in a sensor device (e.g., the sensor device 120 in FIG. 1).

For example, the at least one sensor 320 may include the camera. For example, the at least one sensor 320 may monitor the user 310 in real time and obtain the state information including at least one of a posture, a motion, biometric information, or any combination thereof of the user.

For example, the autonomous driving control device may identify a state of the user 310 based on the state information and determine whether the state information satisfies a specified condition. For example, the autonomous driving control device may identify that the specified condition is satisfied when the user 310 is in the drowsy state based on the state information.

For example, when it is identified based on the state information that the user 310 is gripping a steering wheel 330, the autonomous driving control device may identify that the user is not in the drowsy state.

For example, the autonomous driving control device may determine that the user 310 is in the drowsy state when it is identified that the user 310 is bowing a head thereof. However, the user 310 may be in a situation of using the at least one multimedia device or the user terminal while bowing the head thereof. Therefore, in this case, the determination of the user being in the drowsy state by the autonomous driving control device may be an erroneous determination. Accordingly, according to one embodiment of the present disclosure, the autonomous driving control device may further use whether the user 310 is using the at least one multimedia device and/or the at least one external device (e.g., the user terminal) to determine whether to additionally provide the user interface about the transfer of the control right of the host vehicle to the user 310.

Figure 4:
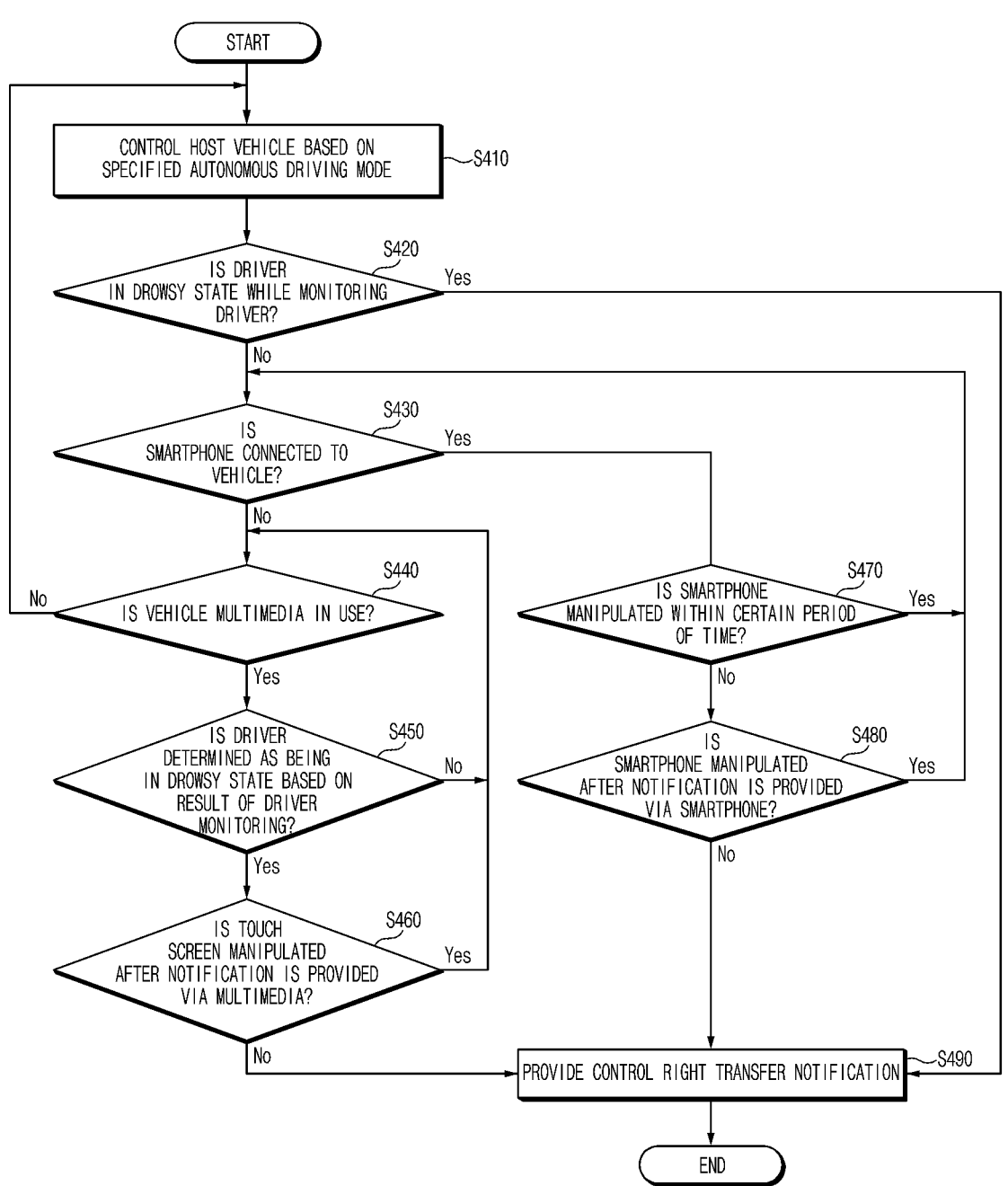
FIG. 4 is an operation flowchart of an autonomous driving control device according to an embodiment of the present disclosure.

FIG. 4 is an operation flowchart of an autonomous driving control device according to an embodiment of the present disclosure.

According to one embodiment, an autonomous driving control device (e.g., the autonomous driving control device in FIG. 1) may perform operations disclosed in FIG. 4. For example, at least some of components (e.g., at least one of the memory 110, the sensor device 120, the controller 130, the display device 140, the communication device 150, or any combination thereof in FIG. 1) included in the autonomous driving control device may be set to perform the operations in FIG. 4.

In a following embodiment, operations from S410 to S490 may be sequentially performed, but are not necessarily sequentially performed. For example, an order of each operation may be changed, or at least two operations may be performed in parallel. In addition, contents with respect to FIG. 4 corresponding to or duplicated with the above contents may be briefly described or omitted.

According to one embodiment, the autonomous driving control device may control the host vehicle based on the specified autonomous driving mode (S410).

For example, the autonomous driving control device may control the host vehicle based on an autonomous driving operation mode of a specified level (e.g., the level 3 and/or the conditional autonomous driving mode). In this regard, the autonomous driving control device may identify occurrence of a situation in which the control right of the host vehicle must be transferred to the user.

According to one embodiment, the autonomous driving control device may determine whether the driver (or the user) is in the drowsy state while monitoring the driver (S420).

For example, the autonomous driving control device may determine whether the driver is in the drowsy state based on the state information of the user obtained using the at least one sensor included in the sensor device.

For example, when the driver is in the drowsy state (e.g., operation S420—Yes), the autonomous driving control device may perform operation S490.

For example, when the driver is not in the drowsy state (e.g., operation S420—No), the autonomous driving control device may perform operation S430.

According to one embodiment, the autonomous driving control device may determine whether the smartphone (or the at least one external device) is connected to the vehicle (S430).

For example, when the smartphone (or the at least one external device) is connected to the vehicle (e.g., operation S430—Yes), the autonomous driving control device may perform operation S470.

For example, when the smartphone (or the at least one external device) is not connected to the vehicle (e.g., operation S430—No), the autonomous driving control device may perform operation S440.

According to one embodiment, the autonomous driving control device may determine whether the smartphone is manipulated within a certain period of time (S470).

For example, the autonomous driving control device may receive information about whether the user input for the smartphone is received within the specified period of time from the smartphone and determine whether the user input is made to the at least one external device based on the received information.

For example, when it is determined that the smartphone is manipulated by the user within the certain period of time (e.g., operation S470—Yes), the autonomous driving control device may perform operation S430.

For example, when it is determined that the smartphone is not manipulated within the certain period of time (e.g., operation S470—No), the autonomous driving control device may perform operation S480.

According to one embodiment, the autonomous driving control device may provide the notification (or the user interface) via the smartphone and then determine whether the smartphone is not manipulated (S480).

For example, when it is determined that the smartphone is not manipulated within the certain period of time, the autonomous driving control device may provide the notification about the transfer of the control right to the smartphone and determine whether the smartphone is not manipulated even after the notification is provided.

For example, when it is determined that the smartphone is manipulated after the notification (or the user interface) is provided via the smartphone (e.g., operation S480—Yes), the autonomous driving control device may perform operation S430.

In other words, when it is determined that the smartphone is manipulated, the autonomous driving control device may identify that the additional provision of the notification to the user is not required.

For example, when it is determined that the smartphone is not manipulated after the notification (or the user interface) is provided via the smartphone (e.g., operation S480—No), the autonomous driving control device may perform operation S490.

In other words, when the user does not perform the user input (e.g., the touch input to the smartphone) in response to the notification even after the notification is provided via the smartphone, the autonomous driving control device may identify that the additional provision of the notification to the user is required.

According to one embodiment, the autonomous driving control device may determine whether the vehicle multimedia is in use (S440).

For example, the autonomous driving control device may determine whether the at least one multimedia device included in the display device is in use (or operating).

For example, when it is determined that the vehicle multimedia is in use (e.g., operation S440—Yes), the autonomous driving control device may perform operation S450.

For example, when it is determined that the vehicle multimedia is not in use (e.g., operation S440—No), the autonomous driving control device may repeat operation S410.

According to one embodiment, the autonomous driving control device may determine whether the driver is in the drowsy state based on a result of the driver monitoring (S450).

For example, when it is determined that the vehicle multimedia is in use, the autonomous driving control device may monitor the driver again in real time to determine whether the user is in the drowsy state. In other words, whether the driver is in the head down state may be determined.

For example, when it is determined that the driver is in the drowsy state based on the result of the driver monitoring (e.g., operation S450—Yes), the autonomous driving control device may perform operation S460.

For example, when it is determined that the driver is not in the drowsy state based on the result of the driver monitoring (e.g., operation S450—No), the autonomous driving control device may repeat operation S440.

According to one embodiment, the autonomous driving control device may determine whether a touch screen is manipulated after the notification is provided via the multimedia (S460).

For example, when it is determined based on operation S450 that the driver is in the drowsy state, the autonomous driving control device may provide the notification about the transfer of the control right via the multimedia device in use and determine whether the touch screen of the multimedia device is not manipulated even after the notification is provided.

For example, when it is determined that the touch screen is manipulated after the notification is provided via the multimedia (e.g., operation S460—Yes), the autonomous driving control device may perform operation S440.

In other words, when it is determined that the smartphone is manipulated, the autonomous driving control device may identify that the provision of the notification to the user is no longer needed.

For example, when it is determined that the touch screen included in the multimedia device is not manipulated after the notification (or the user interface) is provided via the multimedia (e.g., operation S460—No), the autonomous driving control device may perform operation S490.

In other words, when the user does not perform the user input in response to the notification (e.g., the touch input to the notification displayed on the multimedia device) even after the notification is provided via the multimedia device, the autonomous driving control device may identify that the additional provision of the notification to the user is required.

According to one embodiment, the autonomous driving control device may provide the control right transfer notification (S490).

For example, the autonomous driving control device may provide the notification about the transfer of the control right via the at least one external device (e.g., the display) included in the display device.

For example, the autonomous driving control device may provide the notification about the transfer of the control right using the at least one external device other than the multimedia device that provided the notification.

Figure 5:
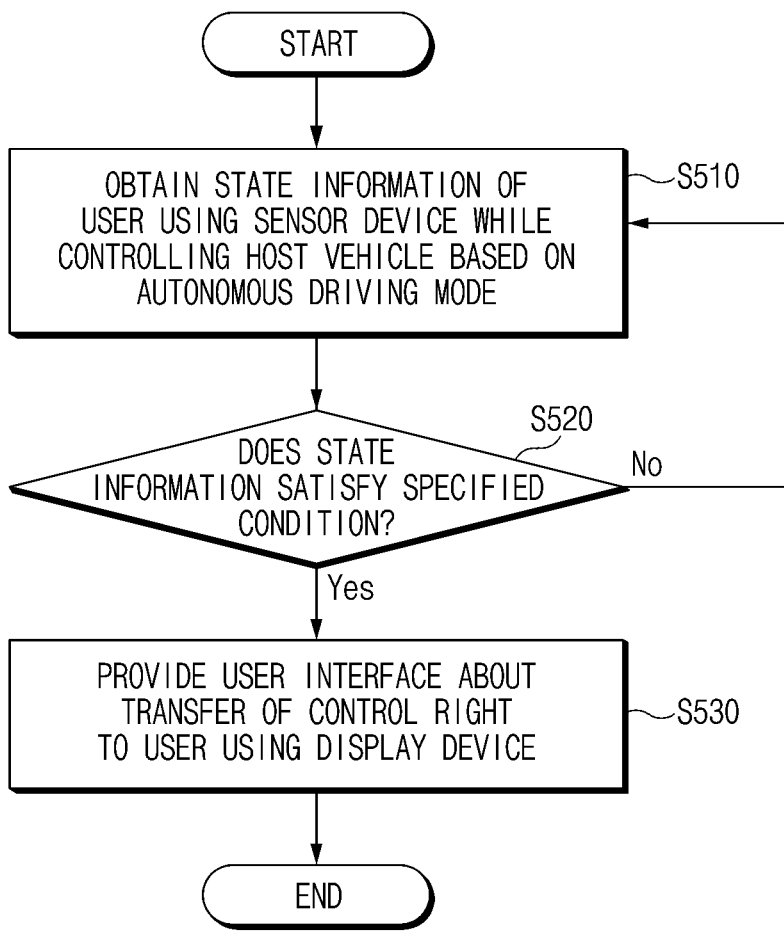
FIG. 5 is an operation flowchart of an autonomous driving control device according to an embodiment of the present disclosure.

FIG. 5 is an operation flowchart of an autonomous driving control device according to an embodiment of the present disclosure.

According to one embodiment, an autonomous driving control device (e.g., the autonomous driving control device of FIG. 1) may perform operations disclosed in FIG. 5. For example, at least some of components (e.g., at least one of the memory 110, the sensor device 120, the controller 130, the display device 140, the communication device 150, or any combination thereof in FIG. 1) included in the autonomous driving control device may be set to perform the operations in FIG. 5.

In a following embodiment, operations from S510 to S530 may be sequentially performed, but are not necessarily sequentially performed. For example, an order of each operation may be changed, or at least two operations may be performed in parallel. In addition, contents with respect to FIG. 5 corresponding to or duplicated with the above contents may be briefly described or omitted.

According to one embodiment, the autonomous driving control device may obtain the state information of the user using the sensor device while controlling the host vehicle based on the autonomous driving mode (S510).

For example, the autonomous driving control device may obtain the state information of the user using the at least one sensor included in the sensor device.

According to one embodiment, the autonomous driving control device may determine whether the state information satisfies the specified condition (S520).

For example, it may be determined whether the user is in the drowsy state based on the state information of the user. For example, whether the user is in the drowsy state may be determined based on the posture (e.g., the head down posture) of the user included in the state information.

For example, when the state information satisfies the specified condition (e.g., operation S520—Yes), the autonomous driving control device may perform operation S530.

For example, when the state information does not satisfy the specified condition (e.g., operation S520—No), the autonomous driving control device may repeat operation S510.

According to one embodiment, the autonomous driving control device may provide the user interface about the transfer of the control right to the user using the display device (S530).

For example, when the user is identified as being in the drowsy state based on the state information, the autonomous driving control device may determine that the state information satisfies the specified condition, provide the user interface about the transfer of the control right to the user using the display device, and transmit the user interface to the external device (e.g., the user terminal) corresponding to the user substantially at the same time such that the user interface is displayed.

For example, when the state information does not satisfy the specified condition, the autonomous driving control device may determine whether the user is using the at least one external device using the sensor device. For example, when the user is using the at least one external device, whether the at least one external device is connected to the autonomous driving control device via the communication device may be identified, and when it is identified that the at least one external device is connected to the autonomous driving control device, the information about whether the user input for the at least one external device is received within the specified period of time may be received from the at least one external device. For example, when it is determined based on the received information that the user input for the at least one external device is received within the specified period of time, the autonomous driving control device may continue to control the host vehicle based on the specified autonomous driving mode.

For example, when the state information does not satisfy the specified condition, the autonomous driving control device may determine whether the user is using the at least one external device using the sensor device. For example, when the user is using the at least one external device, whether the at least one external device is connected to the autonomous driving control device via the communication device may be identified, and when it is identified that the at least one external device is connected to the autonomous driving control device, the information about whether the user input for the at least one external device is received within the specified period of time may be received from the at least one external device. For example, when it is determined based on the received information that the user input for the at least one external device is not received within the specified period of time, the autonomous driving control device may transmit the user interface about the transfer of the control right to the at least one external device. For example, when it is determined that the user input for the at least one external device (e.g., the touch input to the user interface being displayed by the at least one external device) is received after the user interface about the transfer of the control right is transmitted to the at least one external device, the autonomous driving control device may continue to control the host vehicle based on the specified autonomous driving mode. For example, when it is determined that the user input for the at least one external device is not received after the user interface about the transfer of the control right is transmitted to the at least one external device, the autonomous driving control device may provide the user interface about the transfer of the control right to the user using the display device.

For example, when the state information does not satisfy the specified condition, the autonomous driving control device may determine whether the at least one multimedia device included in the display device is being operated by the user.

For example, when the at least one multimedia device is being operated by the user, the autonomous driving control device may provide the user interface about the transfer of the control right to the user via the at least one multimedia device. For example, when it is determined that the user input for the at least one multimedia device (e.g., the touch input to the user interface being displayed by the multimedia device) is not received after the user interface about the transfer of the control right is transmitted to the at least one multimedia device, the user interface about the transfer of the control right may be provided to the user using the at least one external device other than the at least one multimedia device included in the display device.

Figure 6:
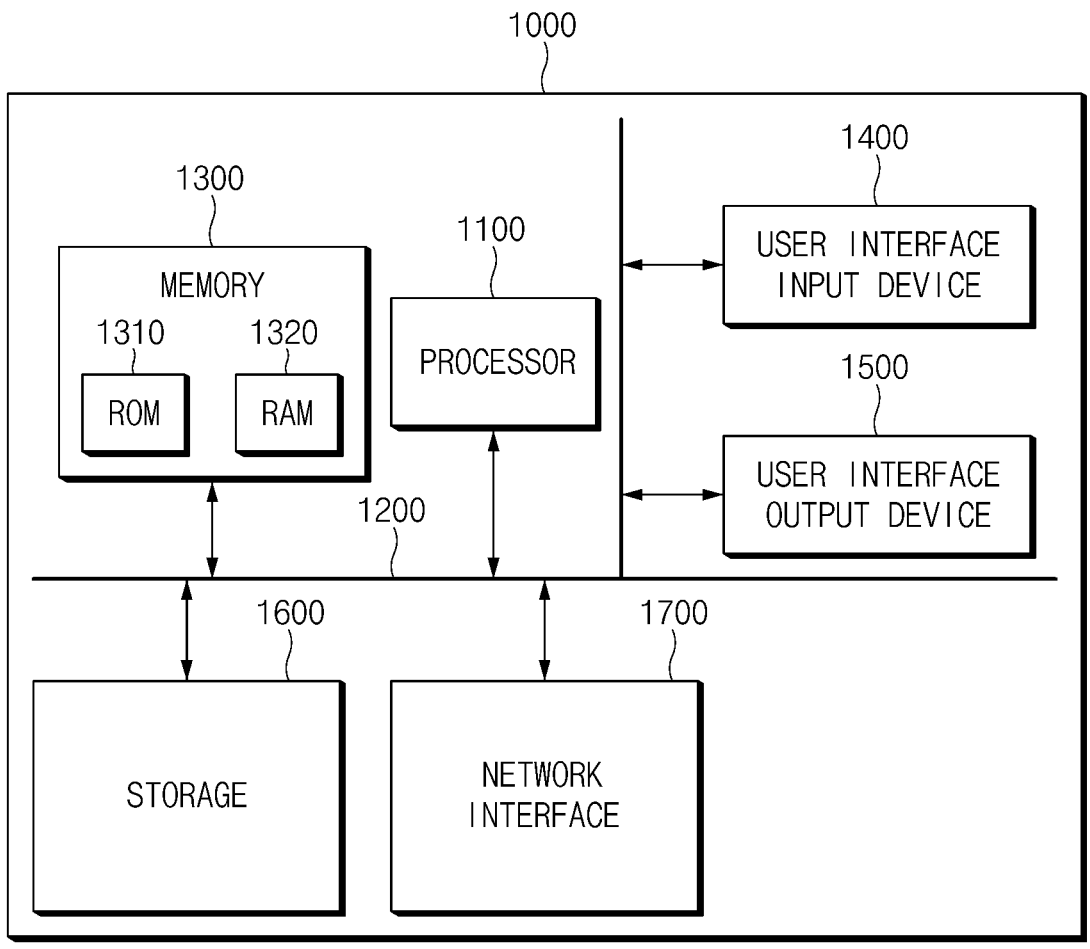
FIG. 6 illustrates a computing system related to an autonomous driving control method according to an embodiment of the present disclosure.

FIG. 6 illustrates a computing system related to an autonomous driving control method according to an embodiment of the present disclosure.

Referring to FIG. 6, a computing system woo related to the autonomous driving control method may include at least one processor 1100, a memory 1300, a user interface input device 1400, a user interface output device 1500, a storage (i.e., a memory) 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100 or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of embodiments of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate embodiments of the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the autonomous driving according to embodiments of the present disclosure will be described as follows.

According to at least one of the embodiments of the present disclosure, when identifying the situation in which the control right must be transferred to the user while controlling the host vehicle based on the autonomous driving mode, the autonomous driving control device may accurately and efficiently provide the user interface about the transfer of the control right to the user using at least some of the pre-arranged components.

In addition, according to at least one of the embodiments of the present disclosure, whether it is necessary to provide the user interface about the transfer of the control right may be identified accurately based on the state of the user by monitoring the state of the user in real time.

In addition, according to at least one of the embodiments of the present disclosure, convenience of the user may be increased by selectively providing the user interface using the user terminal (e.g., the smartphone) and/or the at least one multimedia device (e.g., the display) disposed inside the host vehicle.

In addition, according to at least one of the embodiments of the present disclosure, a function of determining the user state may be more accurately and intuitively performed by determining the user state based on not only the camera but also whether the user input to the user terminal and/or the at least one multimedia device disposed inside the host vehicle is made.

In addition, various effects identified directly or indirectly through embodiments described in the present document may be provided.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous driving control device comprising:
a communication device;
a display device;
a sensor;
a memory having instructions stored thereon; and
a controller operatively connected to the sensor and the memory, wherein the instructions, when executed by the controller, are configured to cause the autonomous driving control device to:
   obtain state information of a user using the sensor while controlling a host vehicle based on a specified autonomous driving mode;
   determine whether a state of the user satisfies a specified condition based on the state information, wherein the specified condition includes whether the user is in a state in which a response to a transfer of a control right of the host vehicle to the user is not able to be performed;
   provide a user interface about the transfer of the control right of the host vehicle to the user using the display device in response to a determination that the state of the user satisfies the specified condition;
   provide the user interface about the transfer of the control right of the host vehicle to the user using an external device other than a multimedia device included in the display device in response to a determination that a user input for the multimedia device is not received after transmitting the user interface about the transfer of the control right to the multimedia device;
   determine whether the user is using the external device by utilizing the sensor in response to a determination that the state of the user does not satisfy the specified condition;
   determine whether the external device is connected to the autonomous driving control device via the communication device in response to a determination that the user is using the external device;
   receive information about whether the user input for the external device is received within a specified period of time from the external device in response to a determination that the external device is connected to the autonomous driving control device; and
   continuously control the host vehicle based on the specified autonomous driving mode in response to a determination, based on the information, that the user input for the external device is received within the specified period of time.

2. The device of claim 1, wherein the instructions, when executed by the controller, are further configured to cause the autonomous driving control device to determine that the state of the user satisfies the specified condition and to provide the user interface about the transfer of the control right to the user using the display device in response to a determination, based on the state information, that the user is in a drowsy state.

3. The device of claim 1, wherein the instructions, when executed by the controller, are further configured to cause the autonomous driving control device to:
   transmit the user interface about the transfer of the control right to the external device in response to a determination, based on the information, that the user input for the multimedia device is not received within the specified period of time.

4. The device of claim 1, wherein the instructions, when executed by the controller, are further configured to cause the autonomous driving control device to continuously control the host vehicle based on the specified autonomous driving mode in response to a determination that the user input for the multimedia device is received after transmitting the user interface about the transfer of the control right to the external device.

5. The device of claim 1, wherein the instructions, when executed by the controller, are further configured to cause the autonomous driving control device to provide the user interface about the transfer of the control right to the user using the display device in response to a determination that the user input for the multimedia device is not received after transmitting the user interface about the transfer of the control right to the external device.

6. The device of claim 1, wherein the external device comprises a user terminal corresponding to the user.

7. The device of claim 1, wherein the instructions, when executed by the controller, are further configured to cause the autonomous driving control device to:
   determine whether the multimedia device included in the display device is in operation by the user in response to a determination that the state of the user does not satisfy the specified condition; and
   provide the user interface about the transfer of the control right to the user via the multimedia device in response to a determination that the multimedia device is in operation.

8. The device of claim 1, wherein the instructions, when executed by the controller, are further configured to cause the autonomous driving control device to transmit the user interface about the transfer of the control right to the external device.

9. A method for controlling autonomous driving, the method comprising:
   obtaining, by a controller, state information of a user using a sensor while controlling a host vehicle based on a specified autonomous driving mode;
   determining, by the controller, whether a state of the user satisfies a specified condition based on the state information, wherein the specified condition includes whether the user is in a state in which a response to a transfer of a control right of the host vehicle to the user is not able to be performed;

providing, by the controller, a user interface about the transfer of the control right of the host vehicle to the user using a display device in response to a determination that the state of the user satisfies the specified condition;

providing, by the controller, the user interface about the transfer of the control right of the host vehicle to the user using an external device other than a multimedia device included in the display device in response to a determination that a user input for the multimedia device is not received after transmitting the user interface about the transfer of the control right to the multimedia device;

determining, by the controller, whether the user is using the external device by utilizing the sensor in response to a determination that the state of the user does not satisfy the specified condition;

determining, by the controller, whether the external device is connected to an autonomous driving control device via a communication device in response to a determination that the user is using the external device;

receiving, by the controller, information about whether the user input for the external device is received within a specified period of time from the external device in response to a determination that the external device is connected to the autonomous driving control device; and continuously controlling, by the controller, the host vehicle based on the specified autonomous driving mode in response to a determination, based on the information, that the user input for the external device is received within the specified period of time.

10. The method of claim 9, wherein providing the user interface to the user comprises determining, by the controller, that the state of the user satisfies the specified condition and providing the user interface about the transfer of the control right to the user using the display device in response to a determination, based on the state information, that the user is in a drowsy state.

11. The method of claim 9, further comprising transmitting, by the controller, the user interface about the transfer of the control right to the external device in response to a determination, based on the information, that the user input for the multimedia device is not received within the specified period of time.

12. The method of claim 9, further comprising continuously controlling, by the controller, the host vehicle based on the specified autonomous driving mode in response to a determination that the user input for the multimedia device is received after transmitting the user interface about the transfer of the control right to the external device.

13. The method of claim 9, further comprising providing, by the controller, the user interface about the transfer of the control right to the user using the display device in response to a determination that the user input for the multimedia device is not received after transmitting the user interface about the transfer of the control right to the external device.

14. The method of claim 9, wherein the external device comprises a user terminal corresponding to the user.

15. The method of claim 9, further comprising:

determining, by the controller, whether the multimedia device included in the display device is in operation by the user in response to a determination that the state of the user does not satisfy the specified condition; and providing, by the controller, the user interface about the transfer of the control right to the user via the multimedia device in response to a determination that the multimedia device is in operation.

16. The method of claim 9, wherein providing the user interface about the transfer of the control right to the user using the display device comprises transmitting, by the controller, the user interface about the transfer of the control right to the multimedia device.

17. A method for autonomously driving a vehicle, the method comprising:

controlling the vehicle to drive in an autonomous driving mode;

obtaining state information of a user using a sensor while controlling the vehicle based on the autonomous driving mode;

determining whether a state of the user satisfies a specified condition based on the state information, wherein the specified condition includes whether the user is in a state in which a response to a transfer of a control right of the vehicle to the user is not able to be performed;

providing a user interface about the transfer of the control right of the vehicle to the user using a display device in response to a determination that the state of the user satisfies the specified condition;

providing the user interface about the transfer of the control right of the vehicle to the user using an external device other than a multimedia device included in the display device in response to a determination that a user input for the multimedia device is not received after transmitting the user interface about the transfer of the control right to the multimedia device;

determining, by the controller, whether the user is using the external device by utilizing the sensor in response to a determination that the state of the user does not satisfy the specified condition;

determining, by the controller, whether the external device is connected to an autonomous driving control device via a communication device in response to a determination that the user is using the external device;

receiving, by the controller, information about whether the user input for the external device is received within a specified period of time from the external device in response to a determination that the external device is connected to the autonomous driving control device; and continuously controlling, by the controller, the vehicle based on the specified autonomous driving mode in response to a determination, based on the information, that the user input for the external device is received within the specified period of time.

18. The method of claim 17, wherein the specified condition is that the user is in a drowsy state.

19. The method of claim 17, further comprising transmitting, by the controller, the user interface about the transfer of the control right to the external device in response to a determination, based on the information, that the user input for the multimedia device is not received within the specified period of time.

20. The method of claim 17, wherein the external device comprises a user terminal corresponding to the user.

* * * * *